US009010740B2

(12) United States Patent
Jaster

(10) Patent No.: US 9,010,740 B2
(45) Date of Patent: Apr. 21, 2015

(54) MULTI-CANTED COILS, TUBES, AND STRUCTURES

(75) Inventor: Mark L. Jaster, Longview, WA (US)

(73) Assignee: Veloce Labs, LLC, Rexburg, ID (US)

( * ) Notice: Subject to any disclaimer, the term of this patent is extended or adjusted under 35 U.S.C. 154(b) by 459 days.

(21) Appl. No.: 13/278,766

(22) Filed: Oct. 21, 2011

(65) Prior Publication Data

US 2012/0098179 A1    Apr. 26, 2012

Related U.S. Application Data

(60) Provisional application No. 61/405,295, filed on Oct. 21, 2010.

(51) Int. Cl.
*F16F 1/06* (2006.01)
*F16F 1/04* (2006.01)

(52) U.S. Cl.
CPC .................................... *F16F 1/045* (2013.01)

(58) Field of Classification Search
USPC .................. 267/158, 166, 167, 180, 1.5, 135; 277/553, 554, 589, 500, 311; 24/20 R, 24/20 S
See application file for complete search history.

(56) References Cited

U.S. PATENT DOCUMENTS

| | | | | |
|---|---|---|---|---|
| 345,767 | A | * | 7/1886 | Buckley .......................... 267/163 |
| 1,867,723 | A | * | 7/1932 | Adams .......................... 267/167 |
| 3,323,785 | A | * | 6/1967 | Mather .......................... 267/167 |
| 3,468,527 | A | | 9/1969 | Mather |
| 4,655,462 | A | | 4/1987 | Balsells |
| 4,826,144 | A | | 5/1989 | Balsells |
| 4,830,344 | A | | 5/1989 | Balsells |
| 4,876,781 | A | | 10/1989 | Balsells |
| 4,893,795 | A | | 1/1990 | Balsells |
| 4,907,788 | A | | 3/1990 | Balsells |
| 4,915,366 | A | | 4/1990 | Balsells |
| 4,917,302 | A | | 4/1990 | Steinetz et al. |
| 4,961,253 | A | | 10/1990 | Balsells |
| 4,964,204 | A | | 10/1990 | Balsells |
| 4,974,821 | A | | 12/1990 | Balsells |
| 5,108,078 | A | | 4/1992 | Balsells |
| 5,139,243 | A | | 8/1992 | Balsells |
| 5,139,276 | A | | 8/1992 | Balsells |
| 5,160,122 | A | | 11/1992 | Balsells |
| 5,161,806 | A | * | 11/1992 | Balsells .......................... 277/383 |
| 5,203,849 | A | | 4/1993 | Balsells |
| 5,239,737 | A | | 8/1993 | Balsells |
| 5,265,890 | A | * | 11/1993 | Balsells .......................... 277/467 |
| 5,358,224 | A | * | 10/1994 | Balsells .......................... 267/33 |
| 5,503,375 | A | | 4/1996 | Balsells |
| 5,542,682 | A | | 8/1996 | Goldstein et al. |
| 5,615,870 | A | | 4/1997 | Balsells |
| 5,709,371 | A | | 1/1998 | Balsells |
| 5,791,638 | A | | 8/1998 | Balsells |
| 5,818,324 | A | * | 10/1998 | Richels .......................... 338/162 |

(Continued)

*Primary Examiner* — Thomas J Williams
*Assistant Examiner* — Mariano Sy
(74) *Attorney, Agent, or Firm* — Ascentage Law, PLLC; Travis L. Johnson

(57) ABSTRACT

Coil, tube, and other structures configured with a plurality of individual coils, internal structures, legs or extensions with each having multiple cants per coil, internal structure, leg or extension, and wherein the cants formed therein allow for a load-deflection force when each is compressed. In addition, any horizontal or moment forces are substantially reduced and/or eliminated when a downward vertical force is applied, as minimal or no torsion is created in the individual coils, legs or extensions.

18 Claims, 23 Drawing Sheets

(56) References Cited

U.S. PATENT DOCUMENTS

| | | | |
|---|---|---|---|
| 5,931,830 A * | 8/1999 | Jacobsen et al. | 604/523 |
| 6,159,055 A * | 12/2000 | Satitpunwaycha et al. | 439/700 |
| 7,055,812 B2 | 6/2006 | Balsells | |
| 7,074,096 B2 * | 7/2006 | Copper et al. | 439/843 |
| 7,274,964 B2 | 9/2007 | Balsells | |
| 8,336,864 B2 * | 12/2012 | Noh | 267/167 |
| 2011/0037234 A1 * | 2/2011 | Balsells et al. | 277/562 |
| 2011/0062640 A1 * | 3/2011 | Leon | 267/166 |

\* cited by examiner

FIG. 12A  FIG. 12B  FIG. 12C  FIG. 12D
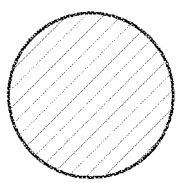
FIG. 13A  FIG. 13B  FIG. 13C
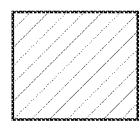
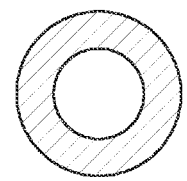
FIG. 13D  FIG. 13E  FIG. 13F

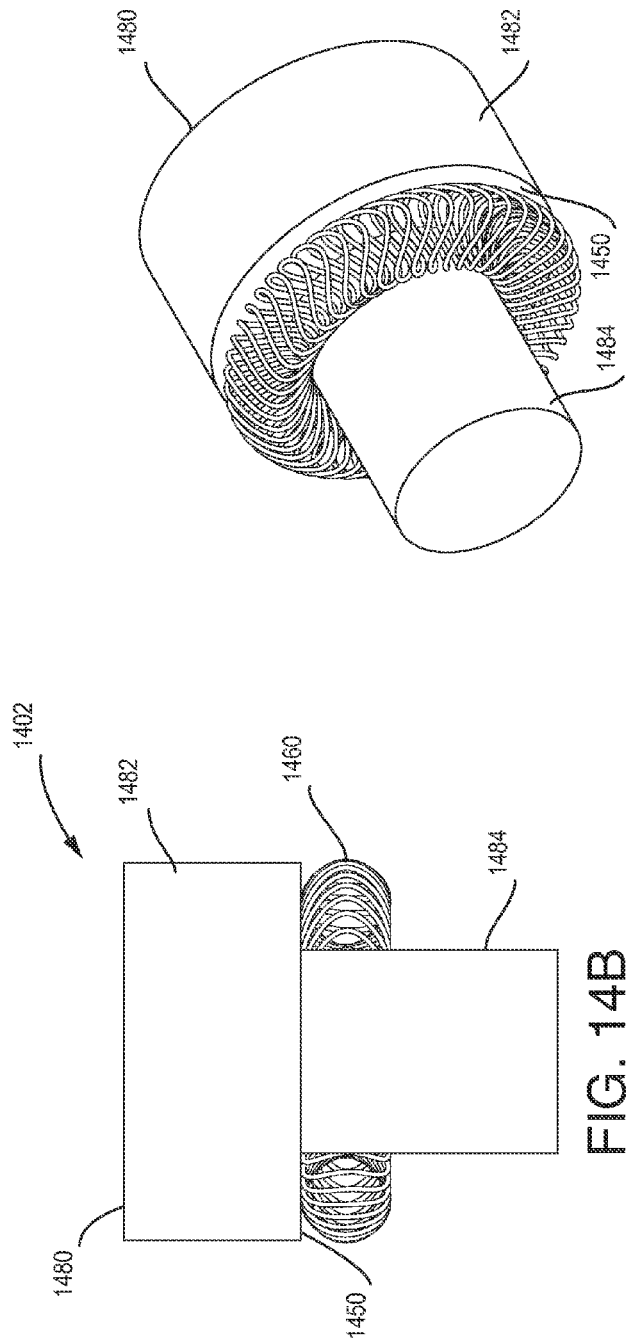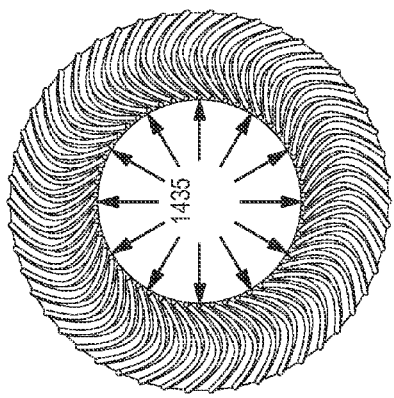

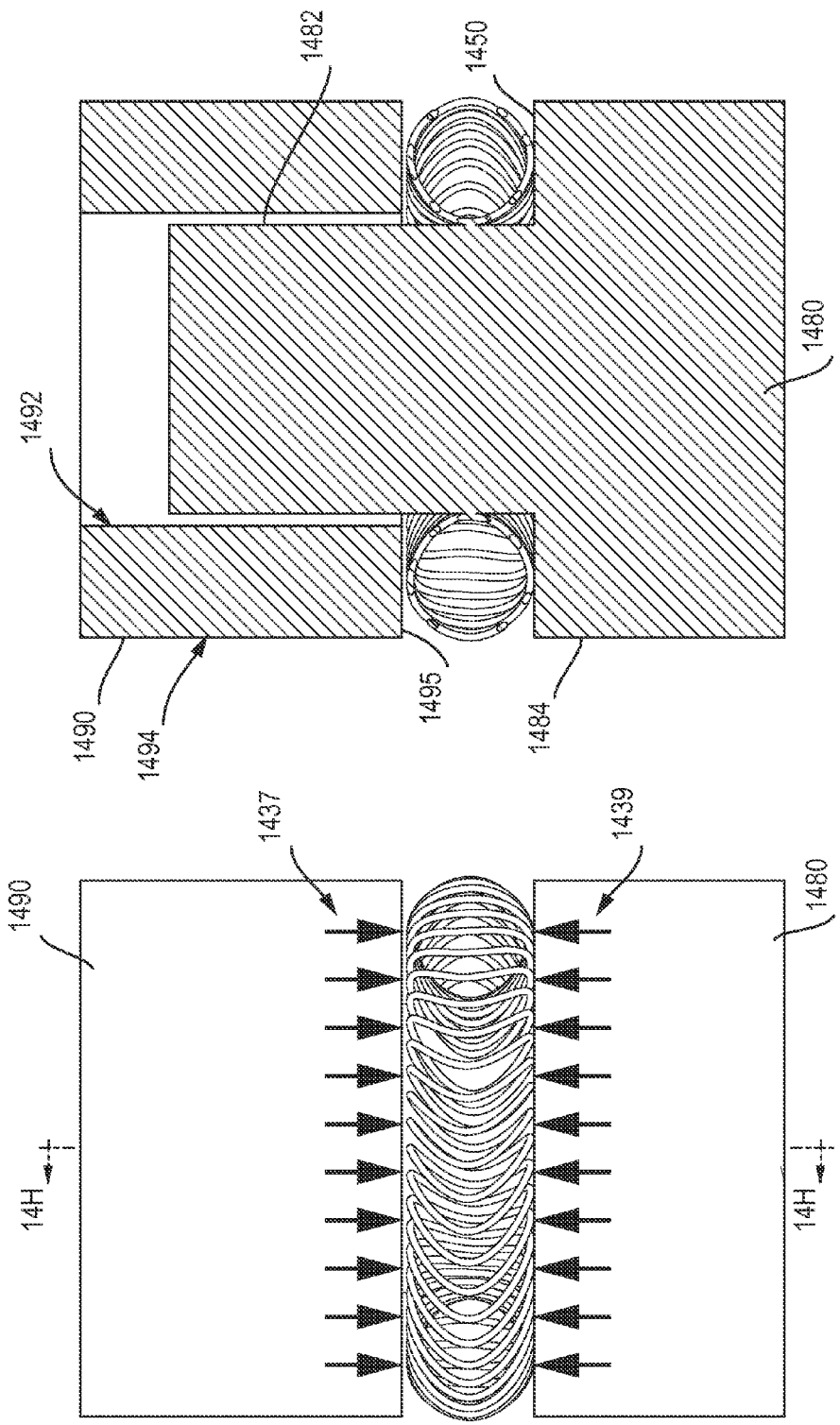

MULTI-CANTED COILS, TUBES, AND STRUCTURES

CROSS-REFERENCE TO RELATED APPLICATIONS

This application claims priority under 35 U.S.C. §119 to the following U.S. Provisional Patent Application, which is hereby incorporated by reference in its entirety: U.S. Ser. No. 61/405,295 filed Oct. 21, 2010.

THIRD PARTY RIGHTS

This invention was made with government support under NASA prime contract NNC06BA07B. The Government has certain rights in the invention.

COPYRIGHT STATEMENT

A portion of the disclosure of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present embodiments relate generally to mechanical springs, tubes, and other structures utilizing a multi-canted design.

2. Description of the Prior Art

Coil springs are used in a variety of mechanical applications to lift, pull, spin, compress, seal, store energy, balance, connect, lock, dampen and so forth. The characteristics and uses of compression, extension, and torsion springs have typically been altered by changing the spring's material, coil geometry, wire size, number of coils and varying the spring's attributes and dimensional ratios. For example, previous single or single-varying canted coils designs have been developed to allow for force-deflection characteristics perpendicular to the length of the coil and/or coil axis. In other instances, single-canted garter-type coils have been designed for axial-loaded applications.

A general discussion of these types of canted-coil and canted garter-type springs and spring design is set forth in U.S. Pat. Nos. 3,468,527; 4,655,462; 4,826,144; 4,830,344; 4,876,781; 4,893,795; 4,907,788; 4,915,366; 4,917,302; 4,961,253; 4,974,821; 4,964,204; 5,160,122; 5,108,078; 5,139,243; 5,139,276; 5,203,849; 5,239,737; 5,503,375; 5,542,682; 5,615,870; 5,709,371; 5,791,638; 7,055,812; and 7,274,964. All these patents are to be incorporated herein by their specific reference thereto for the purpose of disclosing heretofore coil spring design and manufacture.

However, even with the advancement of load deflection designs and in particular perpendicular load deflection, there is a still a need for improving a coil design to reduce wear against contact surfaces, and to reduce sliding and rotation, which often results in rubbing or scrubbing damage to a contact surface. Additionally, a design is sought that has the ability to form tighter seals/contacts around contoured surfaces and moving contact surface applications when a spring coil is being used as a pre-loader. It is further desired that a coil design has the ability to remain upright without end supports, while having the advantages of load deflection provided by previous canted-coil designs, and an interlocking coil design that could be used to create lightweight structures.

The present embodiments of this application address these and other advantages sought for in a spring coil design and manufacture.

SUMMARY OF THE INVENTION

A coil comprising a plurality of interconnected individual coils is formed along a length of a coil axis, wherein each of the individual coils comprising the coil has two or more cants formed therein, and wherein the cants formed therein are configured to exhibit a load-deflection force when each individual coil is compressed. Tubes and other designs are configured to exert load-deflection forces when compressed through multi-canted portions, legs or extensions from the core design. These multi-canted coils, tubes, and designs are configured to substantially reduce and/or eliminate any horizontal forces or moments created when a downward force is applied to the multi-canted portions of each.

BRIEF DESCRIPTION OF THE DRAWINGS

FIGS. 12A-D illustrate side or top view multi-canted portions of individual coils in a multi-canted design.

FIGS. 13A-F illustrate various cross-sections of wires used in a multi-canted coil spring.

FIGS. 14A-H illustrate a multi-canted garter-type coil around various shafts and systems, and in some views demonstrating dampening forces in multiple directions.

DETAILED DESCRIPTION OF THE PREFERRED EMBODIMENT

Figure 1A:
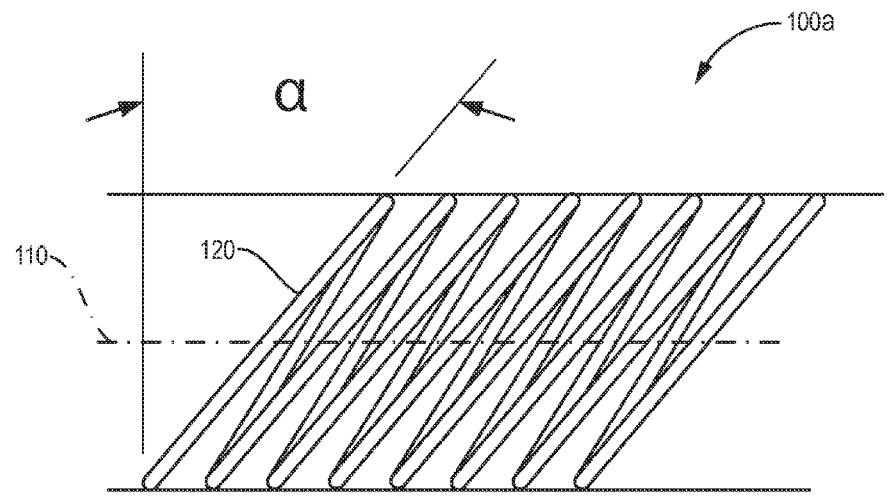
FIGS. 1A-B illustrate a side-view of canted coil springs having either a single or single-varying cants along individual coils of the spring.
Figure 1B:
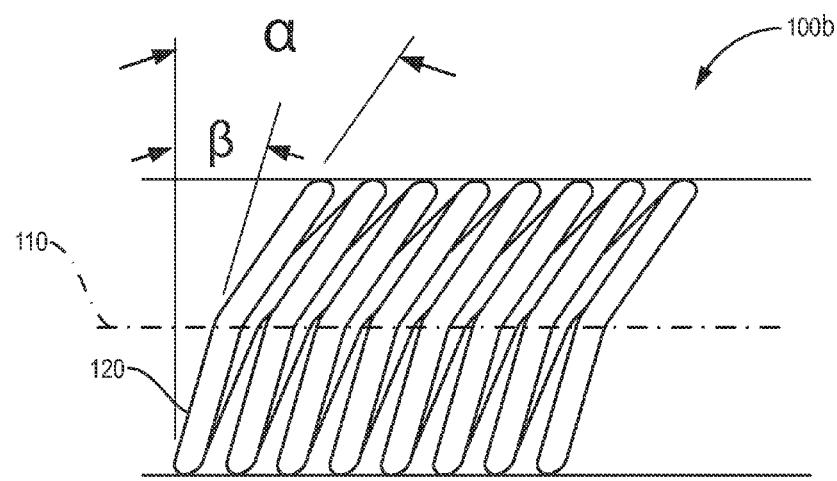
Figure 2A:
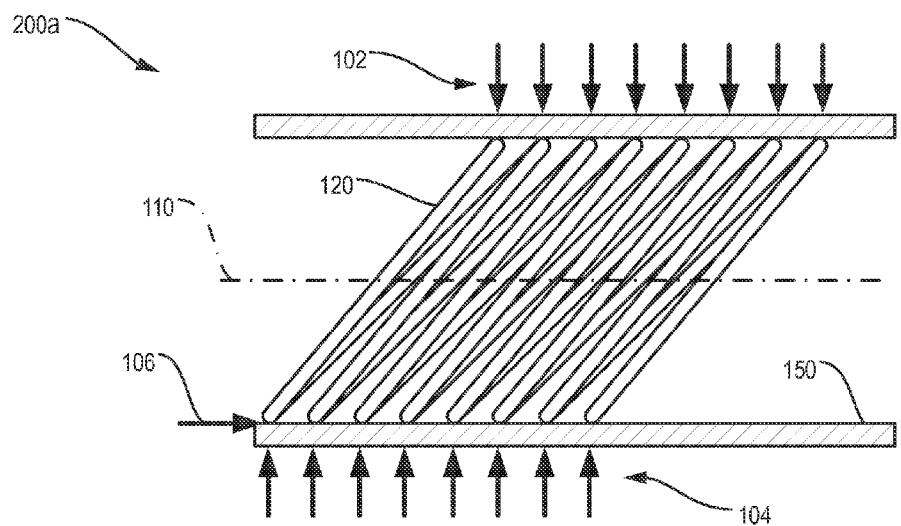
FIGS. 2A-B illustrate various forces exerted on the canted coil springs of FIGS. 1A-B along both the vertical and horizontal axis.
Figure 2B:
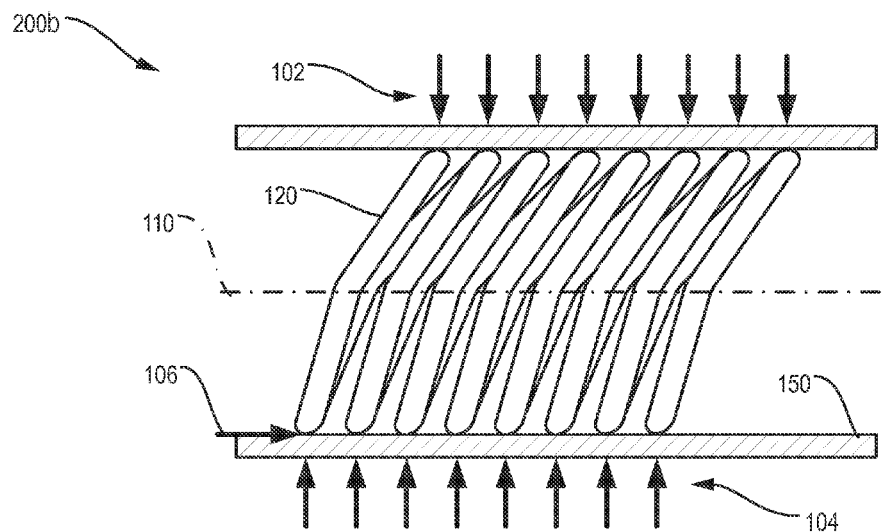
Figure 2C:
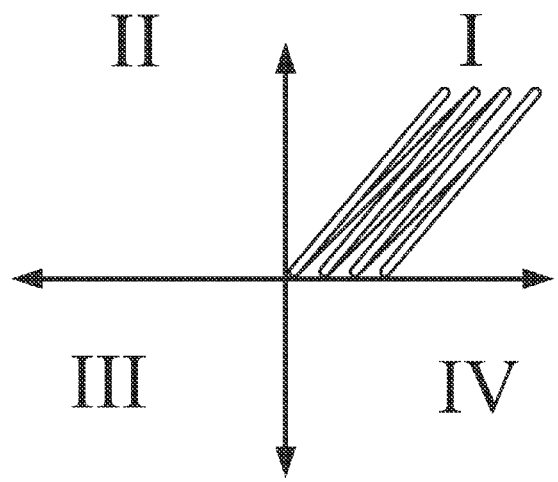
FIGS. 2C-D illustrate portions of the single and single-varying canted coil springs of 2A-B placed in a four quadrant degree coordinate plane.
Figure 2D:
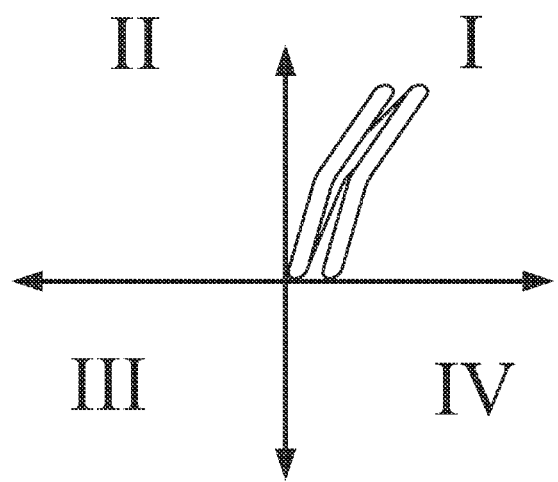

When a round coil spring is canted, the geometry of the coil is changed and takes on a slanted appearance, such as that shown in FIGS. 1A-B. For purposes of this application, a cant refers to a bend, slant, arc or curve along a portion of a coil, rung, leg or other part of a spring or tube wherein an angle, slant, arc, or tilted appearance is formed. A cant may have varying radii such as a curve with varying radii. The cant may be formed with respect to a contact surface, centerline, coil axis, and/or length of a coil or tube. For example, in prior art shown in FIG. 1A, a single-canted portion of each coil having angle α is shown to emanate from the bottom contact surface. However, it may also be said the single cant is formed about the coil axis 110. FIG. 1B illustrates another prior art design where a coil may have varying or variable cants along a portion of an individual coil wherein one portion is canted or formed at angle β and another portion thereafter is canted at angle α. All of these varying or variable cants tend to be formed in a similar direction or quadrant. For instance, as drawn in FIGS. 1A-B angles α and β generally fall between 0 and 90 degrees. When placing these canted designs in a four quadrant coordinate system, such as those shown in FIGS. 2C-D, most of these angles would fall in the first quadrant of a four quadrant 0-360 degree coordinate plane, where 0-90 degrees is the first quadrant, 90-180 degrees is the second quadrant, 180-270 degrees is the third quadrant, and 270 to 360 degrees (or 0) is the fourth quadrant. 0 and 180 degrees comprising the horizontal direction and 90 and 270 degrees comprising the vertical direction. If the angles were measured from the top contact surface shown in FIGS. 1A-B the angles would fall in the third (III) quadrant as shown in FIGS. 2C-D.

Figure 4A:
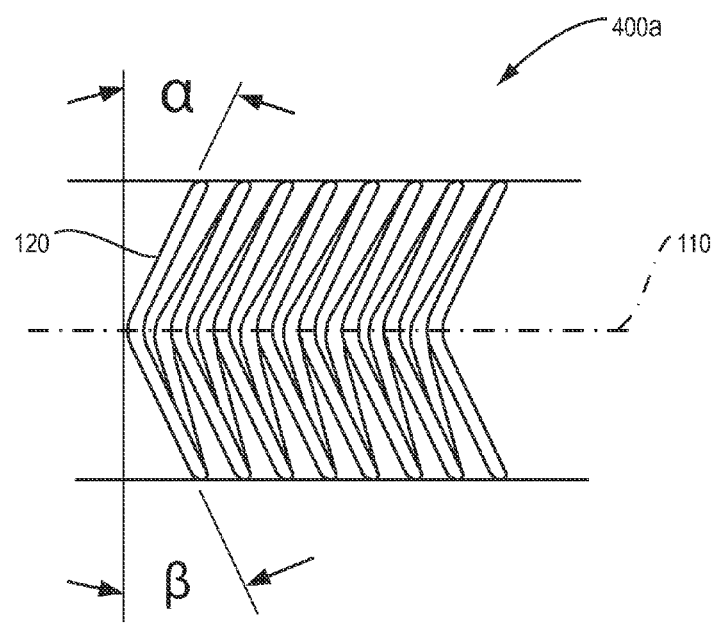
FIG. 4A illustrates a side-view of a multi-canted spring coil showing two angles formed.
Figure 4B:
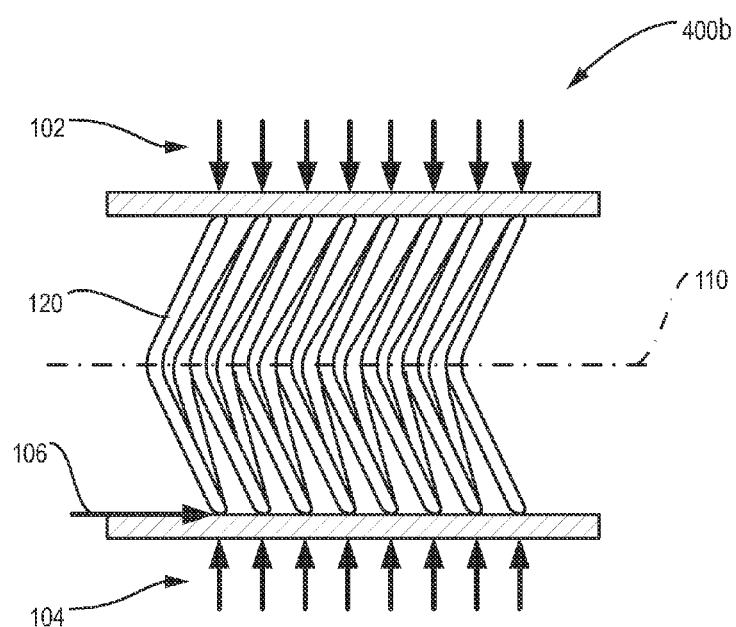
FIG. 4B illustrates various forces exerted on the multi-canted spring coil of FIG. 4A.
Figure 4C:
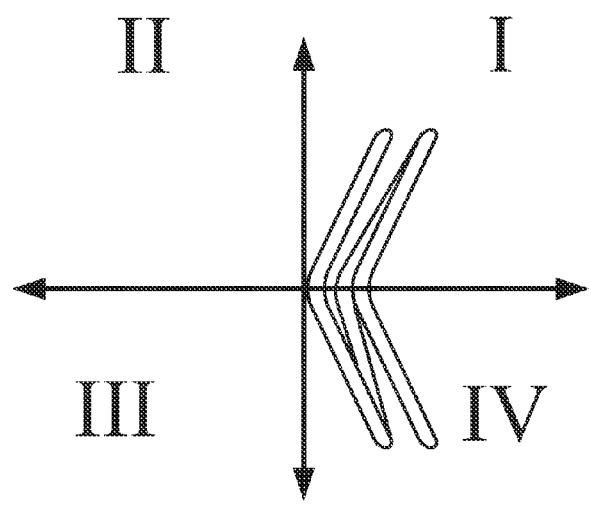
FIG. 4C illustrates a multi-canted coil having canted angles in multiple coordinate plane quadrants.

It will be shown hereafter that the multi-canted configurations generally form angles, bends and/or arcs that when measuring the angles would appear in multiple quadrants, for instance a portion of the coil shown along one plane may have angles appear in multiple quadrants as shown in FIG. 4C where the multiple cants form an arc about the horizontal (0-180) line of the coordinate plane shown. Thus, having multiple cants in more than one quadrant along a single plane is a distinction over previously designed canted coils.

Another key distinction between prior canted-coil designs and the embodiments disclosed herein resides in the mechanical properties exerted when an orthogonal or perpendicular force with respect to the length of a canted coil and/or the axis about which each individual coil of the canted spring coil occurs. For example in FIGS. 2A-B a vertical downward force 102 that is orthogonal to centerline axis 110 is applied to canted coils 200A-B wherein 1) an opposite upward force 104 and 2) a horizontal force 106 or moment are formed. If the horizontal force 106 created in these examples is greater than the friction along the contact surface 150, canted coils 200A-B may shift, slide or move. To avoid sliding in certain cases, the ends of a canted coil are braced against a block, wall or edge. Bracing against such edges may cause additional non-uniform stresses to the individual coils closest to the edge.

Shifting or sliding canted coils may lead to wearing along the contact surface 150 and ultimately cause failure in a particular system or application. For example, applications that experience high duty cycling, vibrations and other such instances may repeatedly wear down the contact surface as a result of the constant rubbing. As a result, these applications may require regular checking and replacement to avoid damage or failure at a critical point. Use in hypersonic applications is one such example where failure could lead to catastrophic situations. One application where previous canted coil springs have been used in hypersonic applications occurs in pre-loader sealing applications, such as one illustrated in FIG. 15 and discussed below.

It should be noted most coil springs are aligned such that each individual coil is formed around a coil axis, such as 110 in FIGS. 1A-2B, that runs the length of a plurality of these interconnected individual coils, thus forming a coil or coil spring.

Other applications using canted coils, such as an electronic application, may rely on the constant connection with the contact surface the spring may be placed on or touching. Any shifting or sliding along this conductive surface may also result in temporary or permanent loss of electrical connection.

As a result, the embodiments described herein have been developed to improve upon previous mechanical spring coil design and more specifically previous canted coil designs. One such improvement described throughout the present application includes two or more cants per coil along the spring's length, where at least one of the cants is formed in a manner that angles or curves back under a first cant, see FIGS. 3A-10. Another example is to have at least one cant along an individual coil (or leg of a tube) in the first quadrant and a second (or third) cant along the same coil (or leg) in the second, third or fourth quadrant. Most often the cants are in the first and fourth quadrants or second and third quadrants.

By countering the cant in one quadrant with a cant in another quadrant the multi-canted coils provided herein improve upon mechanical properties over existing spring designs such as: increased force, and better resilience. The embodiments described herein are also capable of reducing spring size, lowering spring stress, and providing for a lighter spring mass while retaining the ability to apply high forces over current designs.

Figure 3B:
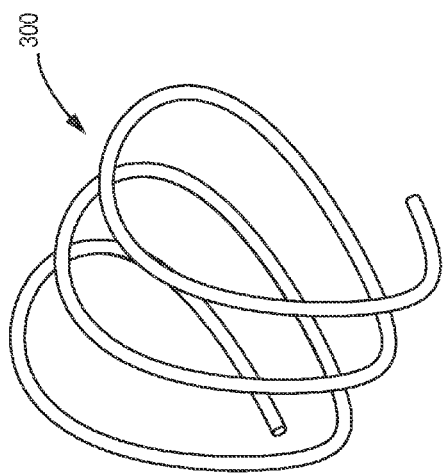
FIGS. 3A-D illustrate various views of a multi-canted spring coil.
Figure 3D:
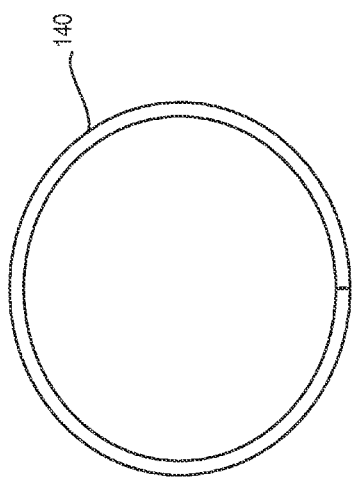
Figure 3A:
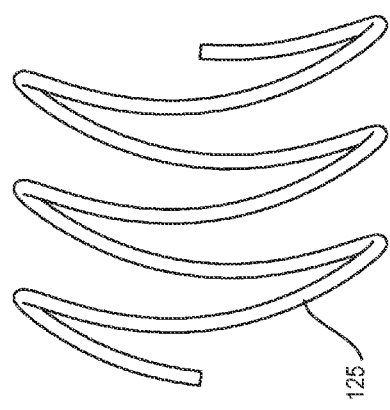
Figure 3C:
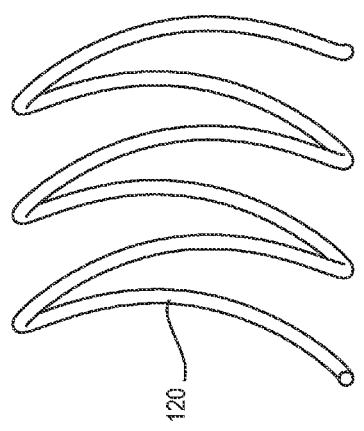
Figure 5A:
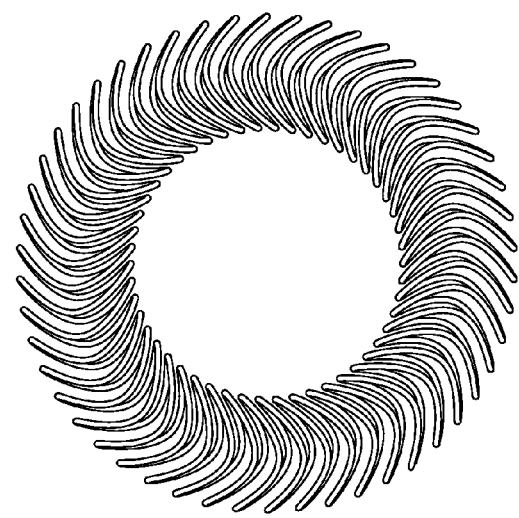
FIGS. 5A-C illustrate various views of a multi-canted garter-type coil.
Figure 5B:
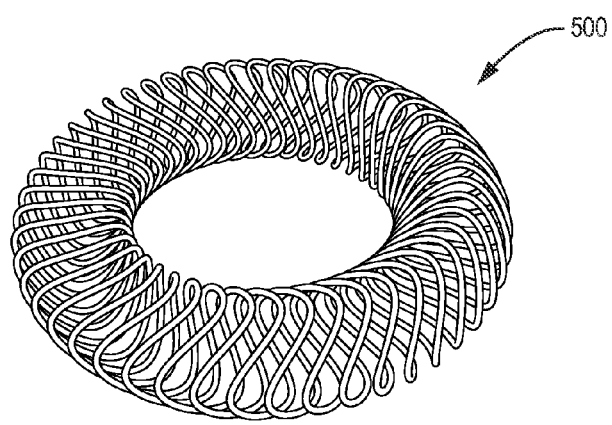
Figure 5C:
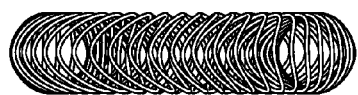

FIGS. 3A-D show various views of a multi-canted spring coil where at least two cants are seen along the top portion 120 of each individual coil shown in the top surface view and plane (FIG. 3A) of multi-canted spring coil 300. Additionally, at least two cants are shown along the side portion 125 shown in the side surface view and plane (FIG. 3C) of the multi-canted spring coil 300. FIG. 3B shows an isometric view of this multi-canted spring coil 300 and FIG. 3D shows each individual coil 140 having a having a circular coil shape as shown in this front view or plane. It will be shown in other embodiments where multiple cants may reside along either the top and bottom or side surfaces running along the length of the coil (or around the diameter in the case of a garter-type coil, such as shown in FIGS. 5A-C).

Advantages of having multiple cants along the top and bottom as well as the side surfaces include deflection in each plane where the multi-cant portions reside. For example, in the embodiment illustrated in FIGS. 3A-D deflection could occur between the top and bottom surfaces and the right and left sides running the length of the coil, as well as between the front and back of the coil. This multi-directional force-deflection capability allows for greater utility. In contrast, previous single-canted or single-variable canted coils only deflect along one plane running the length of the coil. In some embodiments the deflection planes may actually be an infinite number about the length of a multi-canted coil as described herein.

FIGS. 4A-B illustrate a side-view of a multi-canted spring coil similar to the embodiment shown in FIGS. 3A-D. 400A-B are distinguished over the prior art wherein a first cant is formed along portion 120 of an individual coil having an angle α and a second cant is formed along the same portion 120 of the individual coil having an angle β, wherein a downward force 102 (drawn here to be perpendicular to centerline axis 110) applied on each individual coil is substantially near or in a same plane and cancels out an upward force 104 in the same plane. Consequently, a moment or horizontal force 106 along the length of the coil is eliminated or reduced substantially wherein sliding or shifting is eliminated or substantially reduced. Generally, any horizontal force or moment caused by a downward perpendicular force 102 along the length of the spring is insufficient to overcome a static friction force between the coil and the contact surface, thereby eliminating sliding or shifting.

Figure 18:
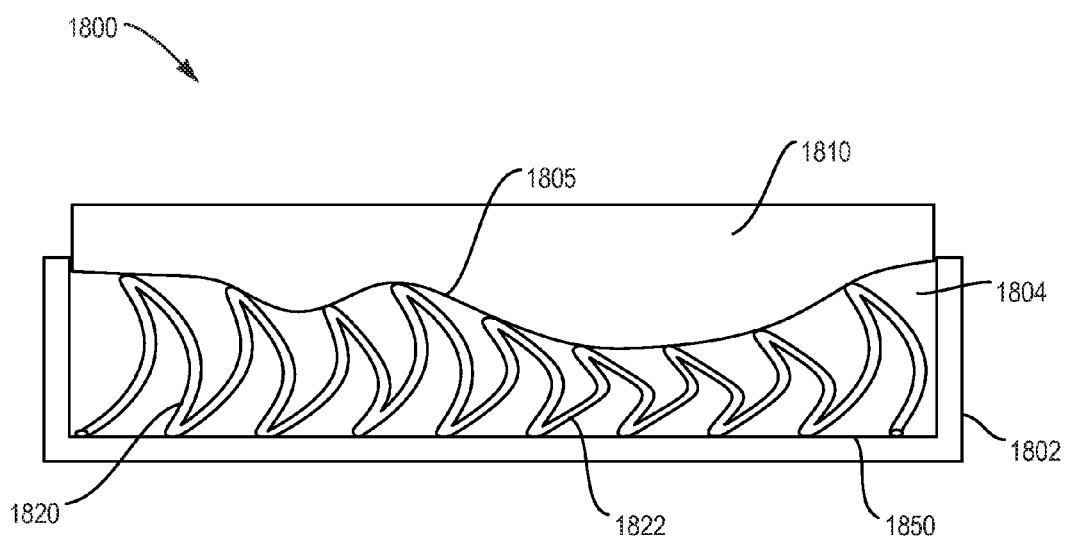
FIG. 18 illustrates a multi-canted coil used in an application with an uneven surface or orthogonal forces along the length of the coil.

Additionally, the offsetting or counterbalancing second cant forming angle β also provides stability to the spring allowing it to stand on edge without falling to the canted side, such as previous designs illustrated in FIGS. 1A-2B have a tendency to do. Furthermore, with each coil less dependent upon an adjacent coil for support many of the multi-canted coils embodiments described herein are configured to apply equal forces along uneven surfaces. An illustration of an uneven surface being applied to a multi-canted spring coil design is illustrated in FIG. 18. Another way of distinguishing the present embodiments over previous canted designs, is less or minimal torsion is created in each individual coil. Previous designs rely heavily on torsion or twisting of the portion of each individual coil that is connected to an adjacent coil to create the perpendicular deflection forces along the length of the canted coil. While in the present embodiments each individual coil's geometry (the multi-canted designs), thickness of wire, shape of wire, and type of wire, create the perpendicular deflection forces without needing to rely on adjacent individual coils. In other terms the multi-canted geometry creates a spring within a spring through deflection forces and not necessarily through torsion forces. Each individual coil may be placed in compression along the coil axis as opposed to in torsion.

Figure 6B:
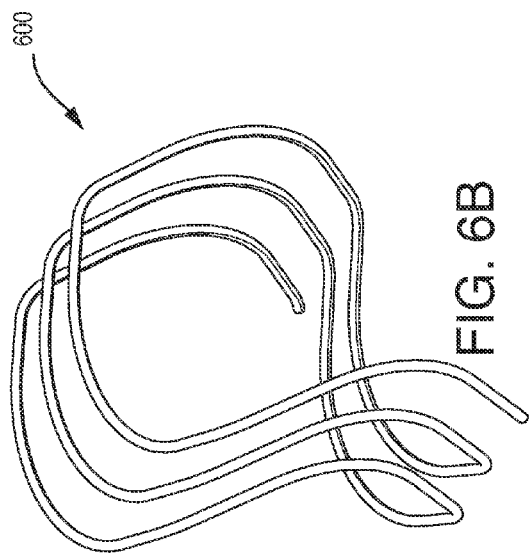
FIGS. 6A-D illustrate various views of a multi-canted spring coil with a square-shaped front view.
Figure 6D:
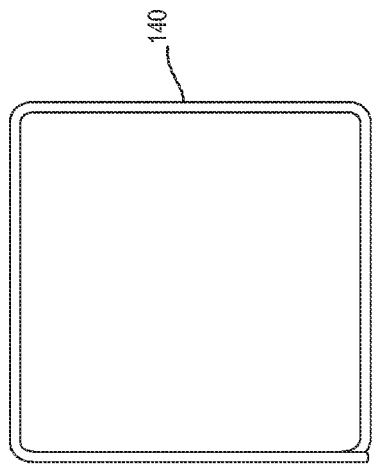
Figure 6A:
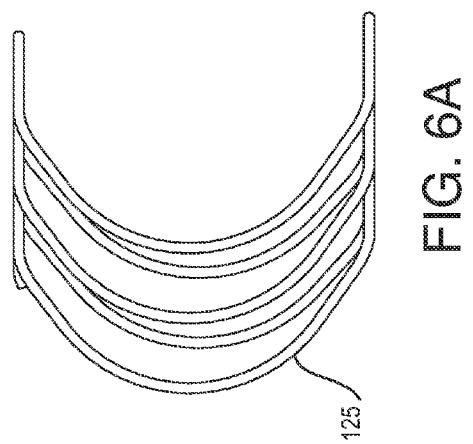
Figure 6C:
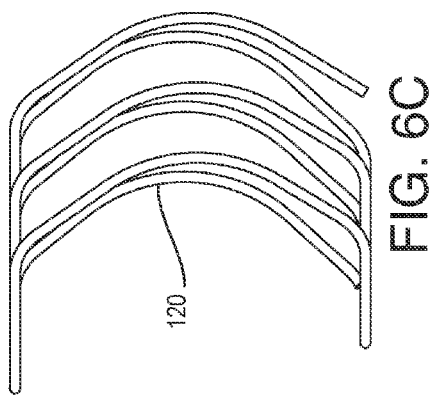
Figure 7B:
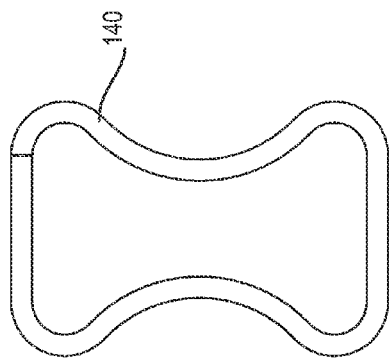
FIGS. 7A-D illustrate various views of another embodiment of a multi-canted spring coil having a repeating coil shape.
Figure 7D:
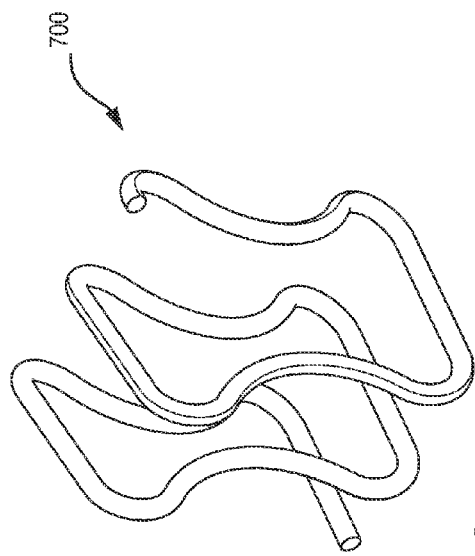
Figure 7A:
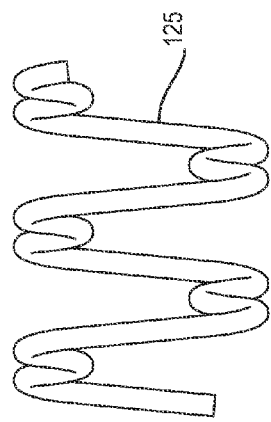
Figure 7C:
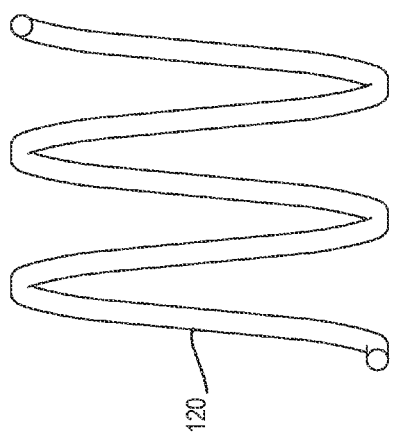

FIGS. 6A-D illustrate a multi-canted spring coil 600 with a individually square-shaped coils shown in front view or plane (FIG. 6D). The embodiment shown, may be adaptable to a channel with square-like cross-section. This embodiment may also prevents the multi-canted spring coil from rolling; though, the number of force-deflection directions is limited by the square shape of each coil as opposed to a round or circular coil previously illustrated in FIGS. 3A-D.

FIGS. 7A-D illustrate another embodiment of a multi-canted spring coil 700 having a repeating individual coil shape where the canted portions of each coil are inwardly directed to the center portion formed of each individual coil. Alternatively, the cants are along an intersecting plane perpendicular to the plane that runs the length of the multi-canted spring coil 700 as opposed to the previous embodiments shown where the cants generally run along the plane of the length of the spring coil. It should be understood that the term individual coil means a completed loop or path of a coil forming a desired shape, such as a circle, square or the individual coil shape 140 illustrated by the front view in FIG. 7D. The completed loop does not necessarily mean the path reconnects with itself in the same plane, which is well understood in the art as each individual coil loops continuously to form the length of a spring coil or garter-type coil. Again, FIGS. 7A-D illustrate that multi-canted coils may have individual cants directed along the length, directed internally or extending externally from an individual coil shape or combination of both.

Figure 8B:
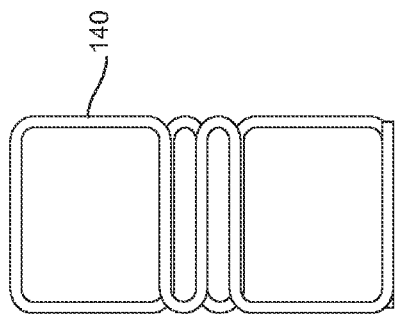
FIGS. 8A-D illustrate another embodiment of a multi-canted spring coil having a repeating coil shape including a torsion bar.
Figure 8D:
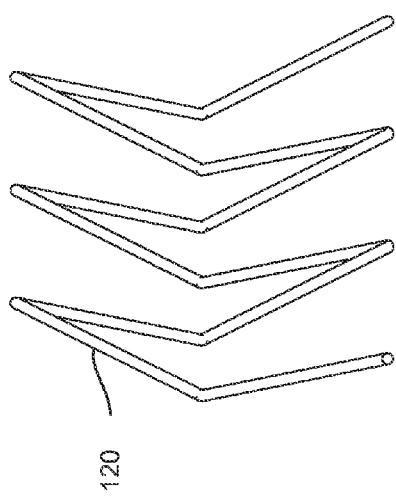
Figure 8A:
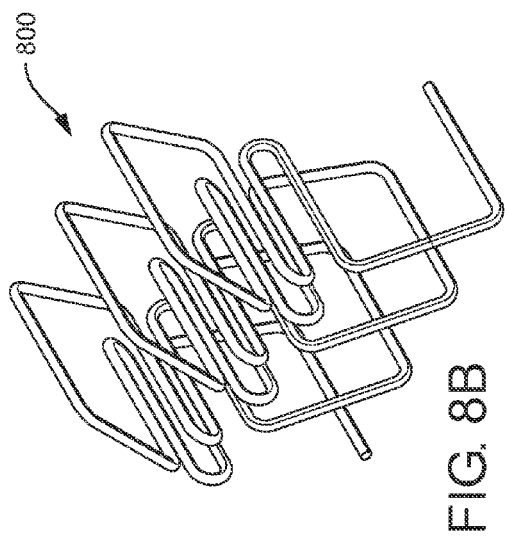
Figure 8C:
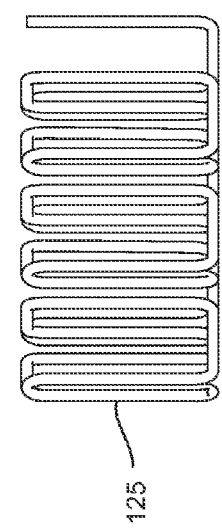
Figure 9B:
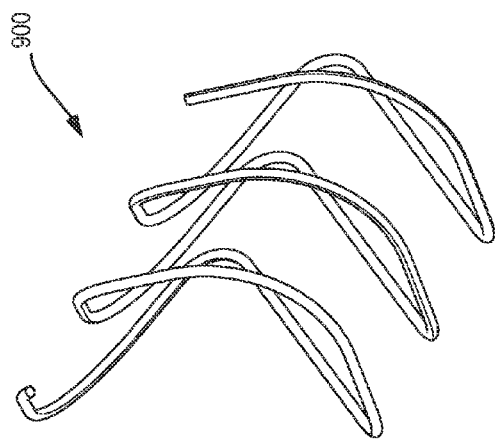
FIGS. 9A-D illustrate another embodiment of a multi-canted spring coil having a repeating coil shape.
Figure 9D:
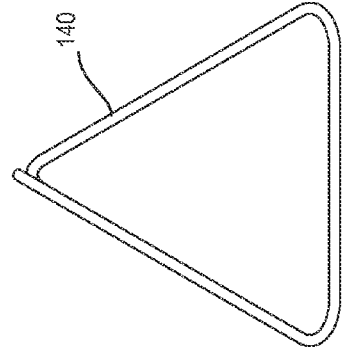
Figure 9A:
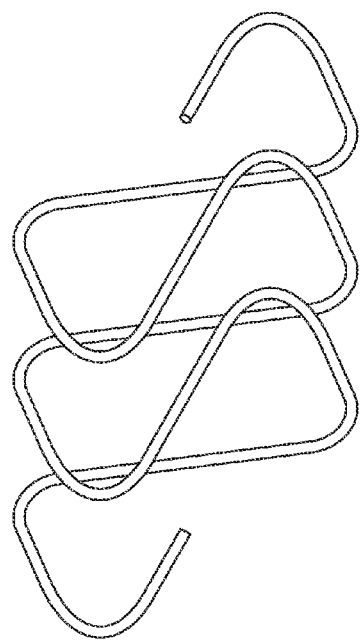
Figure 9C:
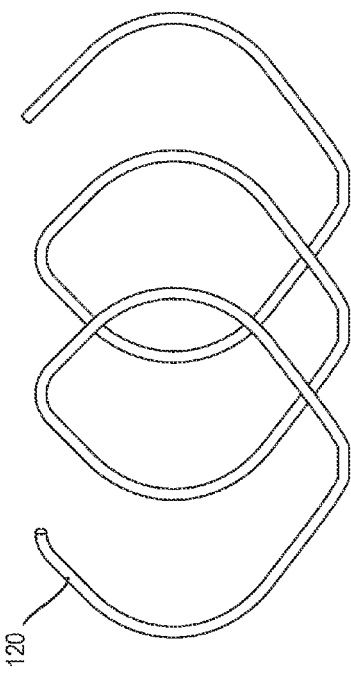

FIGS. 8A-D illustrate another embodiment of a multi-canted spring coil having a repeating individual coil shape, where the canted portions of the individual coils are directed both into the coil shape in addition to running the length of the coil. Here the front view of the multi-canted coil shown in FIG. 8D shows two larger square sections connected with two oblong sections. Part of the completed path or loop of the individual coil actually overlaps itself before forming the completed path or loop. This particular embodiment does incorporate tension bar design within the individual coil shape that works with the multi-canted design to allow for a variable force-deflection response. Often the shape of each coil coupled with the canted portions contributes to creating force-deflection curves that are desirable for each unique application. However, the torsion design illustrated in this embodiment is independent and operates separately from adjacent individual coils.

FIGS. 9A-D illustrate another embodiment of a multi-canted spring coil having a repeating triangular coil shape.

Figure 10:
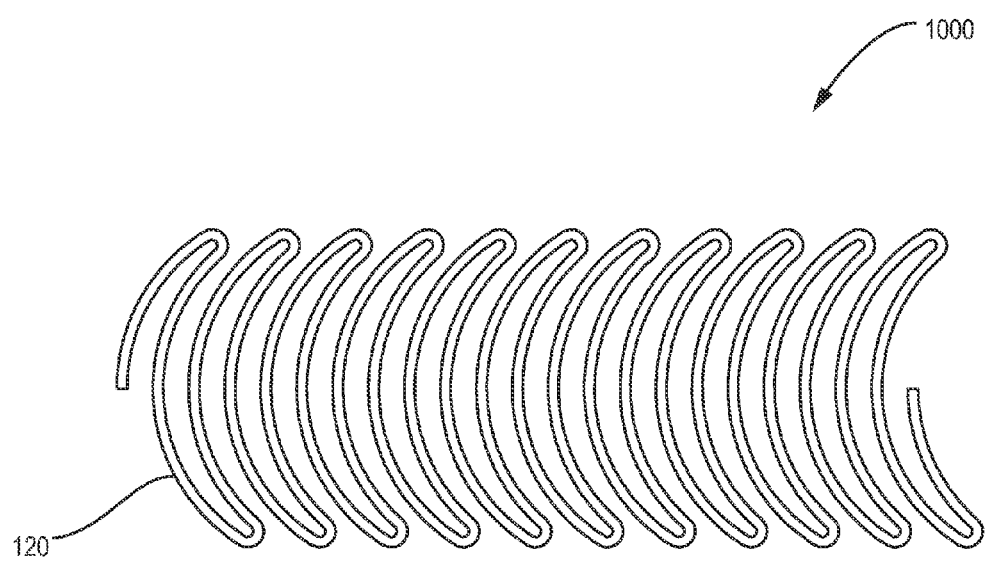
FIG. 10 illustrates a two-dimensional embodiment of a multi-canted spring coil.
Figure 11A:
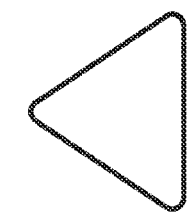
FIGS. 11A-J illustrate various front view shapes of multi-canted coils.
Figure 11B:
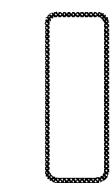
Figure 11C:
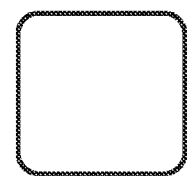
Figure 11D:
Figure 11E:
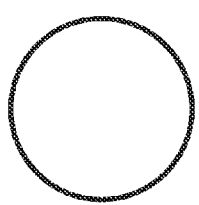
Figure 11F:
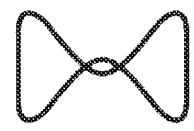
Figure 11G:
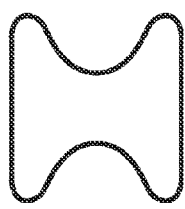
Figure 11H:
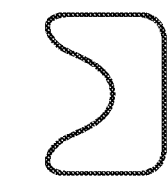
Figure 11I:
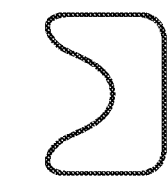
Figure 11J:
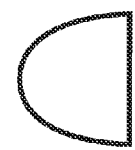
Figure 14A:
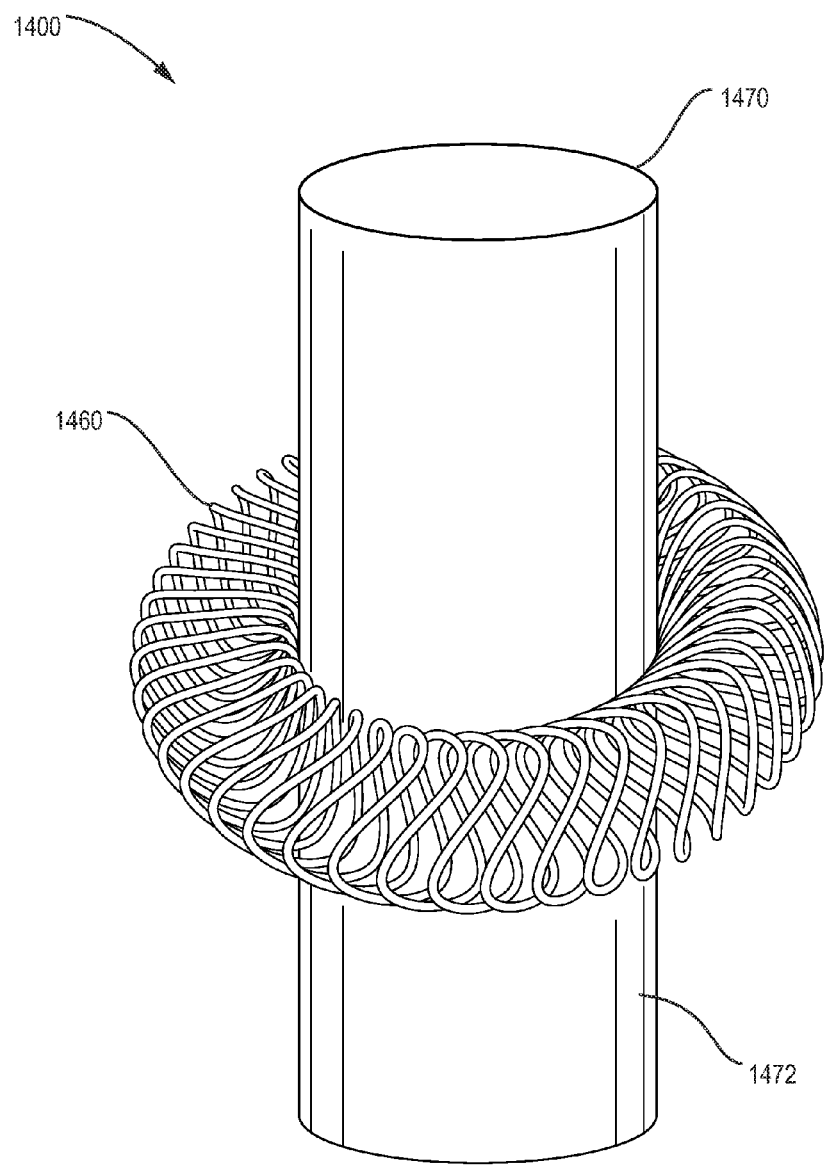
Figure 14E:
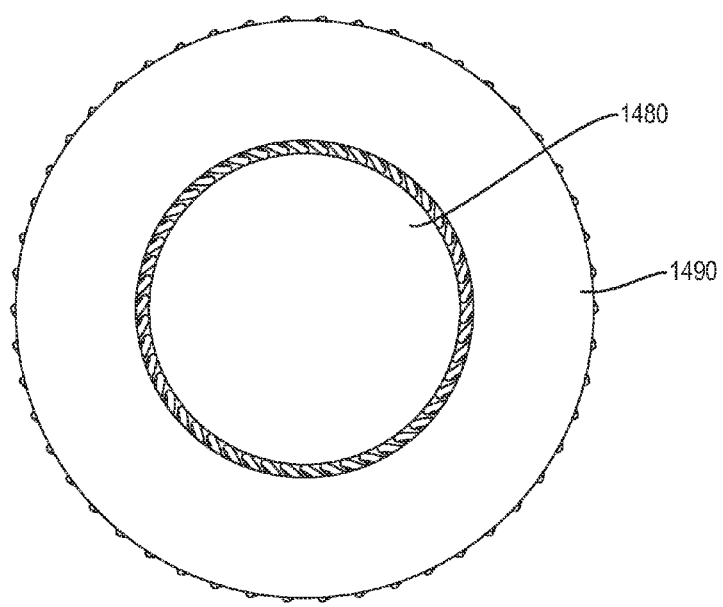
Figure 14F:
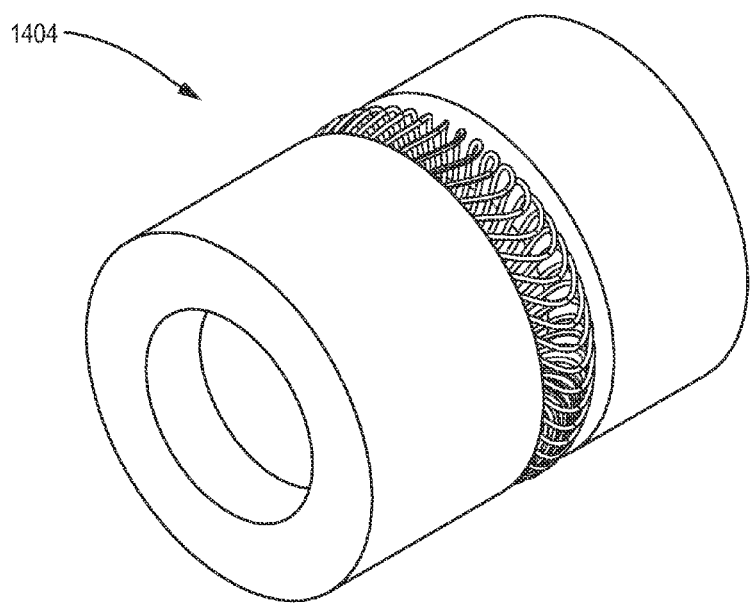

FIG. 10 illustrates a two-dimensional embodiment of a multi-canted spring 1000. The side view of the spring shows a single line illustrating the individual springs tracing down and back up in a linear direction, thus not extending outward into a third plane aside from the thickness of the wire used. Here the two-dimensional multi-canted spring similar to other multi-canted coil springs illustrated, has repeating portions 120 that are multi-canted, bent or arched that form or fit together with the other repeated portions. Because of the two-dimensional design there are no overlapping coils rather each repeating portion 120 acts as an individual spring without looping around to form a coil shape.

In some instances the spacing placed between each repeated portion 120 in FIG. 10 allows for a substantial or complete deflection without the inner portion of each individual spring deflecting to contact an adjacent individual spring. In other instances the spacing is configured so as to allow the inter-weaved individual spring shapes to depress onto an adjacent individual spring after a certain amount of deflection is achieved. This is particularly apparent in two-dimensional shaped multi-canted spring designs.

FIGS. 11A-J illustrate various front view shapes of individual coils. As previously mentioned, individual coil shapes may come in a variety of shapes and sizes. A few of the shapes illustrated include individual coils that overlap a part of the path, and those that contain canted portions such as FIGS. 11G-J.

FIGS. 12A-D illustrate side or top views of portions of individual coils in a multi-canted spring or coil. Similar to the shapes drawn in FIGS. 11A-J showing the front view of individual coils the side or top view illustrating the multi-canted portions of the individual coil generally run along the length of a spring coil and may also come in a variety of configurations. As previously discussed, most of these designs are configured to have the multiple canted portions offset each other along a vertical or perpendicular direction from the horizontal direction running the length of the multi-canted spring coil where a force is likely to be applied, thus reducing shifting or sliding along a horizontal or running length of the spring coil. In particular, FIG. 12D illustrates a multi-canted configuration that features three variable canted portions or two opposing arcs or bends.

FIGS. 13A-F illustrate various cross-sections of wires used in a multi-canted configurations. The cross-sectional shape and type of metal wire, plastic or other material used to form a multi-canted configuration also contributes to the force-deflection and other properties of a multi-canted coil. It is understood that the cross-sections shown as well as other shapes may be used to increase stiffness, surface contact area, manufacturability, weight and other desirable characteristics. However, it should be noted that the multi-canted geometry and embodiments described allows for stiffer properties using the same diameter and cross-sections of previous canted designs. In other words smaller diameters would allow for equivalent load-deflection forces while reducing the amount of material used.

The multi-canted shapes and coils described herein may be formed using 3D casting methods, winding, loosely mated hearing bone gears or other methods of forming coil springs that are known in the art.

Some embodiments 1400, 1402, and 1404 demonstrating some of these force-deflection capabilities are illustrated in FIGS. 14A-H. In these embodiments a garter-type multi-canted coil 1460 (similar to the one shown in FIGS. 5A-C) is placed around a shaft in each embodiment. Shaft 1470, shown in FIG. 14A has a uniform diameter and outer surface 1472 where inward directed force created by coil 1460 is exerted, thus illustrating a load deflection force in one plane.

The coil-shaft embodiment 1402 illustrated in FIGS. 14B-D shows shaft 1480 having multiple outer diameters as shown by outer surface 1482 having a smaller diameter then outer surface 1484. Coil 1460 is placed up against contact surface 1450 and as drawn in FIG. 14D an outward force 1435 corresponds to inward force (not labeled) produced by coil 1460.

Coil shaft embodiment 1404 illustrated in FIGS. 14E-H illustrates the same shaft in FIGS. 14B-D with a collar 1490 placed around shaft 1480 having an outer diameter 1494 and an inner diameter 1492. FIG. 14G illustrates forces 1437 and 1439 being exerted between the contact surface 1495 of collar 1490 and contact surface 1450 of shaft 1480, thus demonstrating another plane coil 1460 can exert a load-deflection force. FIG. 14H illustrates a cross-sectional view of 14G.

Figure 15:
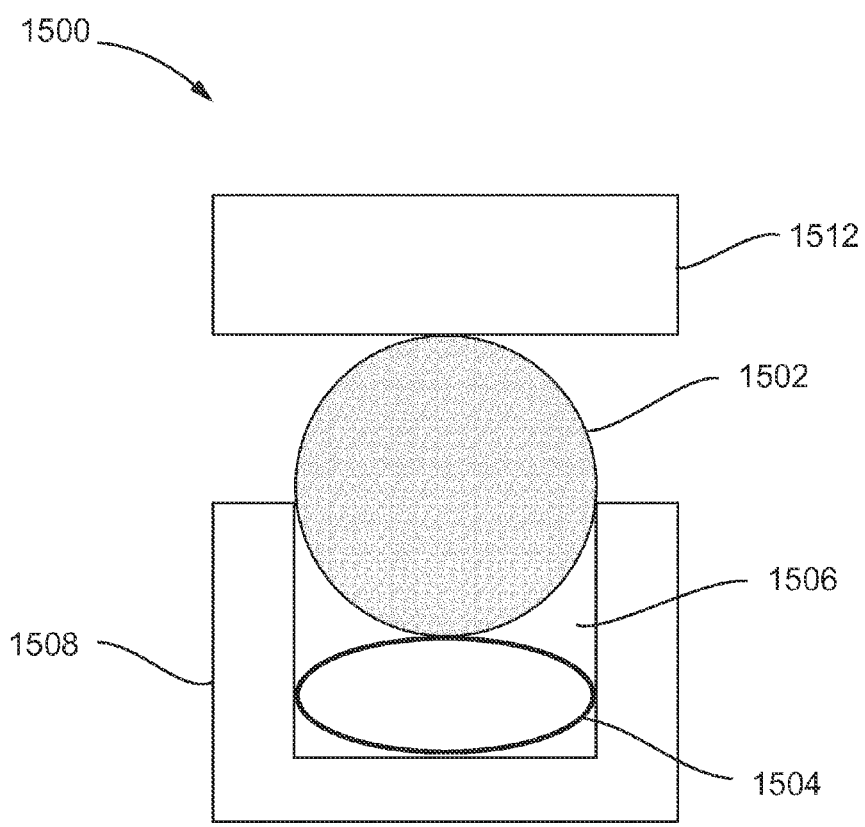
FIG. 15 illustrates a multi-canted coil used as a pre-loader in a sealing application.
Figure 16A:
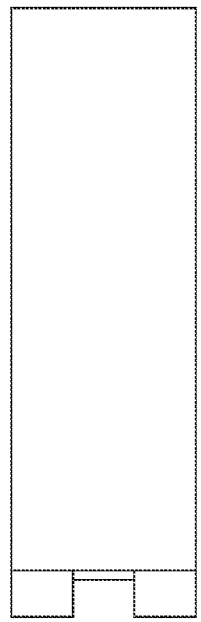
FIGS. 16A-D illustrate embodiments of a tube having multi-canted legs protruding therefrom.
Figure 16B:
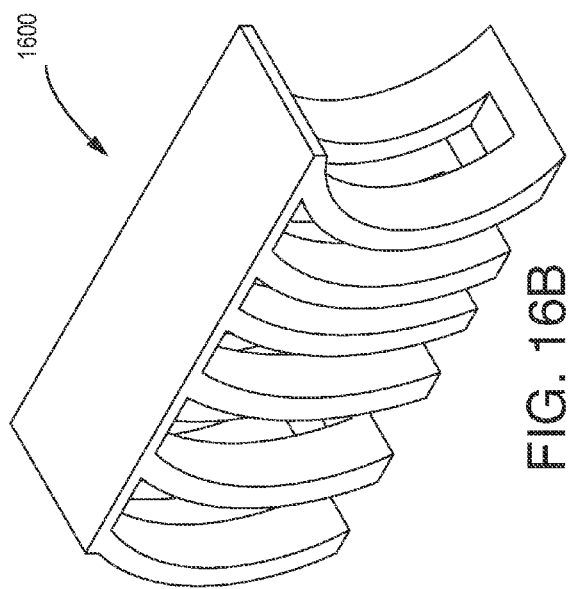
Figure 16D:
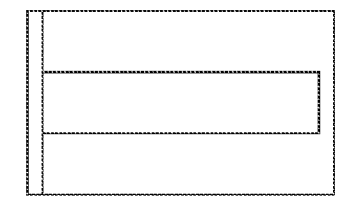
Figure 16C:
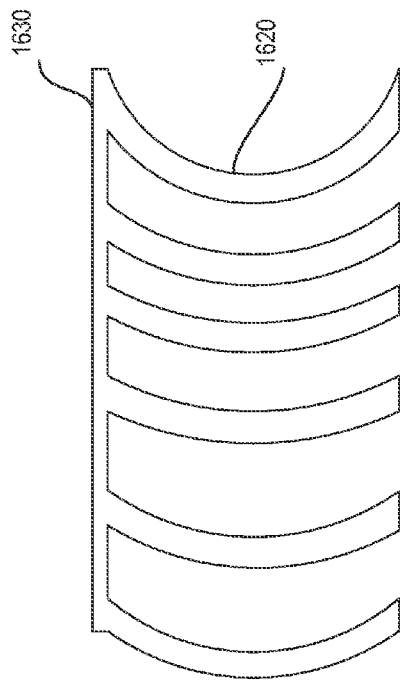

FIG. 15 illustrates multi-canted coil 1504 used as a pre-loader in a sealing application 1500. As discussed previously, advantages of using a multi-canted coil as described and illustrated herein are: 1) improvement to a coil's ability to apply perpendicular forces; 2) upon loading, the lower resultant stresses within the Multi-canted Coil provide increased dependability by extending the fatigue life of the spring; 3) the multi-canted coil design provides higher forces therefore less material is required to make the spring resulting in a reduced spring weight and savings in material costs; 4) wear against coil contact surfaces is reduced because there is less sliding and rotation where each coil contacts a surface (e.g., less rubbing/scrubbing damage to contacting surfaces); 5) each individual coil is less dependent upon adjacent coils for support to remain upright, which is beneficial in applications where there are no stops constraining the ends of the spring or where a short spring is used, while a traditional single-canted coil spring with only a couple of coils would not remain upright and fall over where a multi-canted coil would not; 6) the multi-canted coil design may replace prior single-canted coils as preloaders in static and dynamic sealing applications by increasing sealing capabilities between gaps in both contoured and moving contact surface applications; 7) unlike traditional helical springs (e.g., garder springs), multi-canted coil seals do not expand horizontally when compressed vertically so they can reduce or remove unneeded or undesired forces on sides of channels in which they lay while providing increased forces in desired direction; 8) some multi-canted coil designs have bi- or even multi-directional capabilities such as adding force/recovery in multiple directions perpendicular to the coil length simultaneously and as noted and illustrated in FIG. 14, a single multi-canted garter-type spring can provide bi-directional shaft alignment, support, suspension, and dampening; 9) the deflection of the multi-canted coil can be controlled by altering combinations of the spacing between coils or the coil material itself.

For sealing application 1500, seal 1502 is placed on top of coil 1504 in cavity 1506 formed out of body 1508. Cover 1512 is placed on top of seal 1502 to form a tight seal. This sealing application is particularly useful in hypersonic applications, such as doors sealing, landing gear, and so forth. It is important to have coil 1504 as a pre-loader, particularly in applications where vibrations, duty cycling, and other movement are experienced, so that seal 1502 is held in place with a constant force exhibited by multi-canted coil 1504. As previously discussed, one can see where shifting or rubbing on seal 1502 might be detrimental to the purpose of the sealing application.

FIGS. 16A-D illustrate embodiments of a tube 1600 having multi-canted legs 1620 protruding therefrom. As illustrated, the individual multi-canted legs may each have a unique multi-cant form with varying widths, angles, curves and so forth. The top 1630 may also act as a sealing portion in certain applications. In other embodiments the hollow body of the tube may be configured similar to a billet and internally seal or close as the tube is compressed along the tube axis running the length of the tube. As encompassed within the scope of this application, a variety of internal structures of a coil, tube or other structural design may utilize the multi-canted design described herein to create load-deflection, sealing and contouring benefits.

Figure 17:
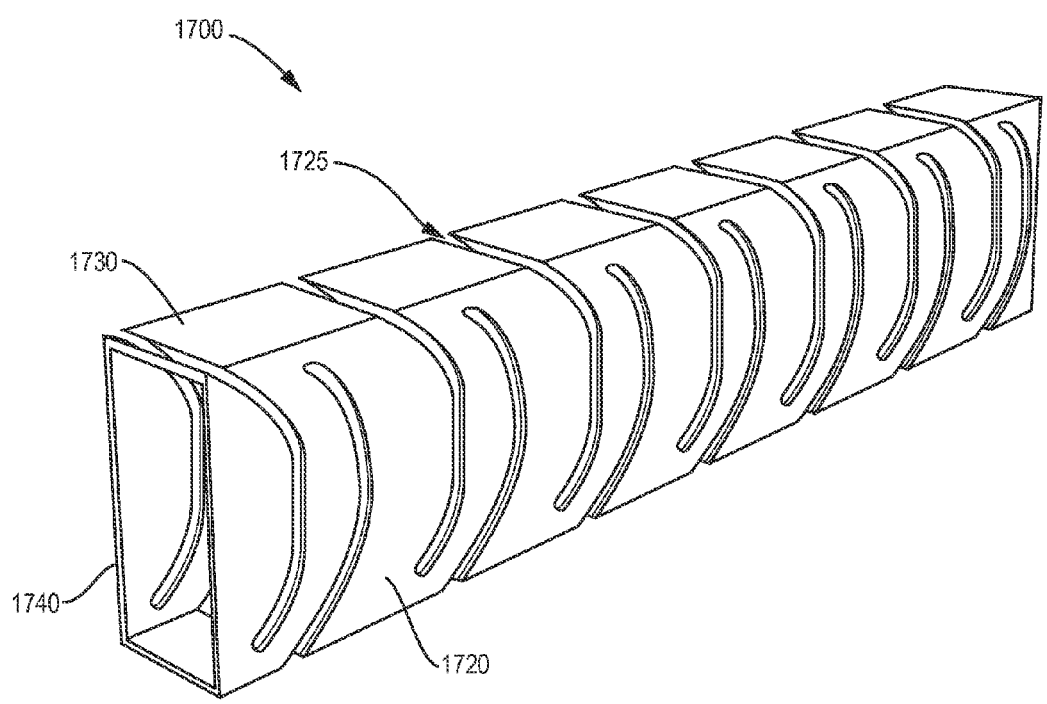
FIG. 17 illustrates a sealing tube using a multi-canted design.

FIG. 17 illustrates a sealing tube 1700 using a multi-canted design. Multi-canted tubes can act as both a spring and as a spring/seal in one. As drawn, slots 1725 are curved to form curved or multi-canted sections 1720, which when compressed allow for sections 1730 to form a seal. This sealing tube 1700 has a rectangular cross-section 1740. Alternate embodiments follow similar patterns to those mentioned above for multi-canted coil springs.

Multi-canted tubes provide sealing surfaces in and of themselves. These tubes may be constructed form rolled metal sheet stock or tubes with a series of double cants cut into the tube prior to rolling the sheet stock or cut directly into the tube itself. This technique will give tubes resilient conforming sealing surfaces in and of themselves having both preloading and sealing characteristics. The reduction of these now unneeded materials (elastomer, safil, ceramics, etc.) will allow for improved chemical and high-heat resistance for use in chemically corrosive environments where conventional systems do not work.

In applications where metals are undesired due to (oxidation, cost, conductivity, weight, EMF shielding, detection, and so forth elastomeric multi-canted tube coils may be used to give increased adaptability and stroke over solid or non-canted elastomeric designs. The multi-canted tube design also gives metal seals significantly increased flexibility and high force output with small space requirements. This allows them to be used as reusable seals where rubber seals are currently used but undesired e.g. in vacuum situations where elastomers outgas.

Multi-canted tubes are easier to manufacture. They can be cut out of tubes, or cut out of sheets and rolled into tubes. Contain a sealing surface and preloader in one for sealing applications.

FIG. 18, as mentioned above shows embodiment 1800 where a body 1810 (or force) has an uneven surface 1805 placing a load onto a multi-canted coil. As illustrated, some individual coils, like 1820, are deflected less than other individual coils, like 1822, in the cavity 1804 formed out of housing 802, having a uniform contact surface 1850. However, it is contemplated, where a multi-canted coil may be sandwiched between two uneven surfaces. Again, as mentioned above, the individual coils respond to, and individually allow for, a more uniform force or seal for various applications. One can easily imagine the contours of a human body lying on a mattress, which may be one application of these multi-canted coils, springs, and tubes.

Additionally, other applications where these multi-canted configurations may be used include:

1. Lip Seals—Used in aerospace and aviation, appliances, chemical processing, electrical/electronic, industrial, and transportation industries.
2. Spacing of heat shields in heat and energy transfer applications—provides an even compliable force between electrical and thermally insulative/conductive material surfaces Ex: Radiant heat multi layer insulation.
3. Shape Memory—including thermally activated mechanical actuators.
4. Drilling Applications—when varying embodiments of the Multi-canted Coil Spring are spun, cutting and relief edges alter and may provide unique cutting capabilities.
5. Mechanical Snakes—Rotor Rooter™, Dremel™ tool, sewer snakes. When the Multi-canted Coil spins, locking contact occurs between adjacent rungs wherever the spring bends around an obstacle. The torque transferred through the coil increase at those points where a traditional helical coil may bind.
6. Conduit—flexibility and rigidity when feeding through cavities.
7. Expanding and locking structural supports and towers. By incorporating interlocks on each coil, the multi-canted coil spring's individual coils can lock against each other and stack up to create a rigid lightweight structure. For instance, a compressed multi-canted coil spring may fit into a smaller package. Upon release the multi-canted spring coil extends in length. Tabs or interlocks placed along the multi-canted portions would allow for the multi-canted spring coil to be rigidly locked and fixed into place, thus forming part of a structural support or tower to be used in a variety of applications. One way of locking the multi-canted spring coil into place may involve rotating each individual coil by 90 degrees where adjacent individual coils would lock into the tab or interlock portion placed. The interlock or tabs may be comprised of a male and female portion and spaced along each individual coil consistently to allow for a twist and lock into place motion, as the multi-canted coil spring extends to form a support structure. Alternatively, individual coils can lock against each other with opposing ramp or wedge like pieces between the peak of one arc and the valley of another arc, thus stacking up to create a rigid lightweight structure.

Figure 19B:
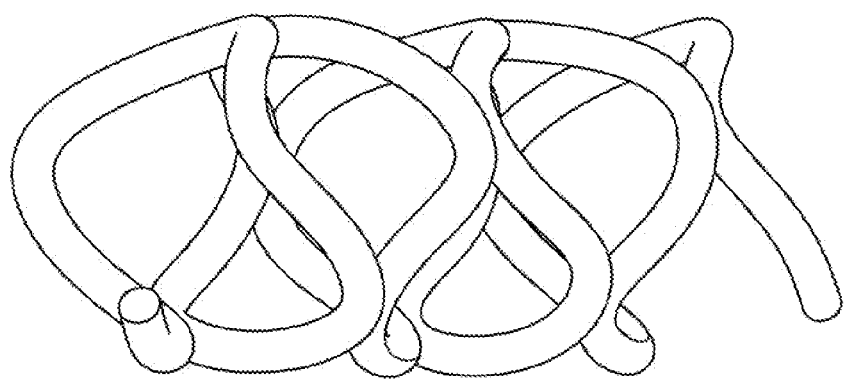
FIGS. 19A-B illustrating a compressed and uncompressed multi-canted coils configured to expand into a support structure or tower.
Figure 19A:
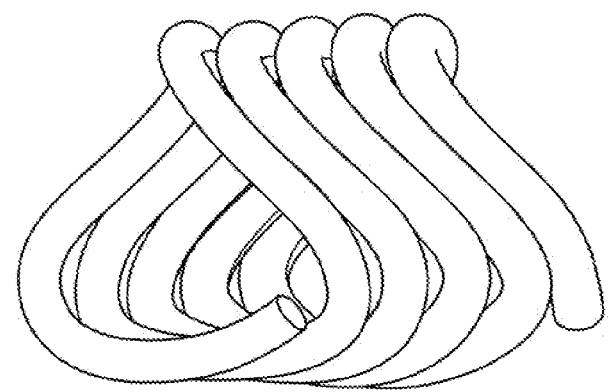

A coil spring can also be designed wherein internal strain energy can be twisted into the system as it is collapsed as shown in FIG. 19A. When the spring is released or unconstrained the coils can "untwist" and be locked into place as shown in FIG. 19B.

expanding the entire system longitudinally adding to the overall expansion of a structure (the taller image). One of various examples of a self expanding structure is the in deployable booms used in satellite systems.

8. Multi-canted coils may be used in antenna designs to filter out undesired and/or amplify signals.
9. Rope Seals—multi-canted coils can replace braided metallic and elastomer preloaders in rope seals. This may reduce the effects of permanent deformation over currently used braided metallics.
10. Toys such as Slinky™—these configurations may decrease the chances of tangling as each coil of the spring cups, fits or forms into adjacent coils.
11. Electrical Contacts—multi-canted coils can provide increased contact force over currently used canted coil springs in electrical connections. Uses include power transmission, distribution switchgears, and cabinet junction assemblies.
12. Electronics—Half of the multi-canted coil spring is either insulative (R-side or L-side) or electrically conductive and used to transmit power or signals. Ex: where there now is a rubber ribbon in a calculator to transmit electrons from the board to the LCD. Another Ex: instead of having separate springs for each pin like in a MacBook Pro power cord, a multi-canted coil Spring could do the same when laid between an array of electrical contact surfaces.
14. Bed Springs—Current spring mattress cores, often called "innersprings," are made up of steel coil springs, or "coils." These springs apply forces in line with their length. Multi-canted coil springs apply more constant forces perpendicular to the springs length which may give added benefits to box spring designs.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A coil, comprising:
a plurality of interconnected individual coils forming a length along a coil axis, wherein each individual coil has two or more cants formed therein a first cant causing a top of each of the individual coils to extend in a first direction with respect to the coil axis and a second cant causing a bottom of each of the individual coils to also extend in the first direction, and wherein the at least two cants formed therein are configured to allow each individual coil to be compressed about the coil axis;
wherein each of the individual coils deflects a certain distance when acted upon by a perpendicular force, and wherein each of the individual coils deflects independently from any adjacent coils and any contact between adjacent coils allows for slidable contact between said coils.

2. The coil of claim 1, wherein the at least two cants form an arc along a portion of each individual coil.

3. The coil of claim 1, wherein the cants are curves with varying radii.

4. The coil of claim 1, wherein the compression of an individual coil does not cause a shifting motion along a contact surface.

5. The coil of claim 1, wherein at least two of the cants formed on each individual coil are angled in different coordinate quadrants in a plane intercepting the cod axis.

6. The coil of claim 1, wherein a downward force that is perpendicular to the coil axis on each individual coil is substantially near or in a same plane and cancels out a perpendicular upward force in the same plane.

7. The coil of claim 1, wherein the coil operates as a canted coil in a pre-loader sealing application.

8. The coil of claim 1, wherein a compression force to an individual coil does not increase the width of the individual coil along an out-of-plane direction.

9. The coil of claim 1, wherein the at least two cants per individual coil are formed in plane perpendicular to the coil axis.

10. The coil of claim 9, wherein at least one additional cant is formed on each individual coil along a plane parallel to the coil axis.

11. The coil of claim 1, configured to exert load-deflection forces in at least two planes.

12. The coil of claim 1, configured to exert load-deflection forces in at least three planes.

13. A coil, comprising:
a plurality of interconnected individual coils forming a length along a coil axis, wherein each individual coil has two or more cants formed therein, a first cant causing a top of each of the individual coils to extend in a first direction with respect to the coil axis and a second cant causing a bottom of each of the individual coils to also extend in the first direction, and wherein the at least two cants formed therein are configured to allow each individual coil to be compressed about the coil axis;
wherein each of the individual coils comprises repeated portions which are spaced apart from corresponding repeated portions of adjacent coils; and
wherein the at least two cants form an arc along a portion of each individual coil.

14. The coil of claim 13, wherein the cants are curves with varying radii.

15. The coil of claim 13, wherein at least two of the cants formed on each individual coil are angled in different coordinate quadrants in a plane intercepting the coil axis.

16. The coil of claim 13, wherein the at least two cants per individual coil are formed in a plane perpendicular to the coil axis.

17. The coil of claim 16, wherein at east one additional cant is formed on each individual coil along a plane parallel to the coil axis.

18. A coil, comprising:
a plurality of interconnected individual coils forming a length along a coil axis, wherein each individual coil has two or more cants formed therein, a first cant causing a top of each of the individual coils to extend in a first direction with respect to the coil axis and a second cant causing a bottom of each of the individual coils to also extend in the first direction, and wherein the at least two cants formed therein are configured to allow each individual coil to be compressed about the coil axis;
each individual coil having at least two contact edges being configured to contact, and receive a perpendicular force from, a pair of contact surfaces, wherein the application of the perpendicular force from one of the contact surfaces results in a perpendicular reactionary force which does not result in a shifting motion between each of the coils and each of the contact surface.

* * * * *